INVENTOR
REGINALD H. HEARD
BY
ATTORNEY

Sept. 9, 1952 R. H. HEARD 2,609,536
JIGGING APPARATUS FOR INDUSTRIAL NAILING MACHINES
Filed April 24, 1950 7 Sheets-Sheet 7

INVENTOR
REGINALD H. HEARD
BY
ATTORNEY

Patented Sept. 9, 1952

2,609,536

UNITED STATES PATENT OFFICE 2,609,536

JIGGING APPARATUS FOR INDUSTRIAL NAILING MACHINES

Reginald H. Heard, Riverside, Calif., assignor to Food Machinery and Chemical Corporation, San Jose, Calif., a corporation of Delaware Application April 24, 1950, Serial No. 157,691

22 Claims. (Cl. 1—1)

This invention relates to the art of jigs and particularly to the jigging of work in special jobs to be assembled in an industrial nailing machine.

As an example of the uses to which the invention may be put, it will be disclosed in the present application as employed in the manufacture of cooling tower grids. These grids are made up of a number of longitudinal parallel wooden slats joined by a plurality of cleats which are disposed at various oblique angles with respect to the slats.

It is an object of the invention to provide an apparatus for jigging special types of assembly jobs, such as occur in manufacturing such grids, to facilitate nailing operations in rapid succession in nonparallel planes with reference to the work.

The manner of accomplishing the foregoing object as well as further objects and advantages will be made manifest in the following description taken in connection with the accompanying drawings in which.

Referring specifically to the drawings, the invention is there shown as embodied in an industrial nailing machine 20 and a jigging apparatus 21 associated therewith.

The nailing machine 20 is only diagrammatically shown herein as reference may be had for the details of this to the co-pending application of Ernest A. Verrinder and Reginald H. Heard, Serial No. 125,275, filed October 29, 1949, on Universal Box Nailing Machine.

The nailing machine 20 includes a frame 22 having vertical standards 23, each of which includes a pair of heavy steel bars 24 which are preferably square in cross section. Secured at their ends by clamps 25 to the bars 24 are heavy longitudinal plates 26 of an anvil base 27. The plates 26 are tied together at spaced intervals by clamp plates 28, 29, 30, and 31.

These clamp plates are united by bolts 32 to corresponding bottom plates 33, 34, 35, and 36. The plate 28 is provided with indexing holes 37 and 38. The clamp plate 30 has an upwardly opening thrust-radial bearing 39 provided thereon which is located at the center of the anvil base 27 and the axis of which lies in the vertical plane which extends between the bars 24 of each standard 23 and is equi-distant from said bars. While the nailing machine 20 is capable of driving nails in a wide variety of patterns, the stresses of driving a single line of nails are most evenly distributed over the machine when these nails are driven in the aforesaid vertical plane containing the axis of the bearing 39. This plane may be referred to hereinafter as the "nail driving plane" of the nailing machine.

The nailing machine 20 also has a nailing mechanism including a driver crosshead 45 which is supported at its opposite ends on devices associated with the standards 23, this crosshead reciprocating downwardly and upwardly with the performing of each nailing operation. Fixed on the driver cross head and extending downwardly therefrom is a lock release bar 46 (Figs. 4, 5, 6, 7, 10, and 14).

The jigging apparatus 21 includes a rotatable anvil table 50 (Figs. 2, 11, and 12) which comprises border plates 51 and 52 which are secured on upper faces of inverted channels 53 and 54 and also united by two systems of bracing 55 and 56. Also fixed upon said channels along outer edges of plates 51 and 52 are angle iron guides 57 and 58.

Figure 11:
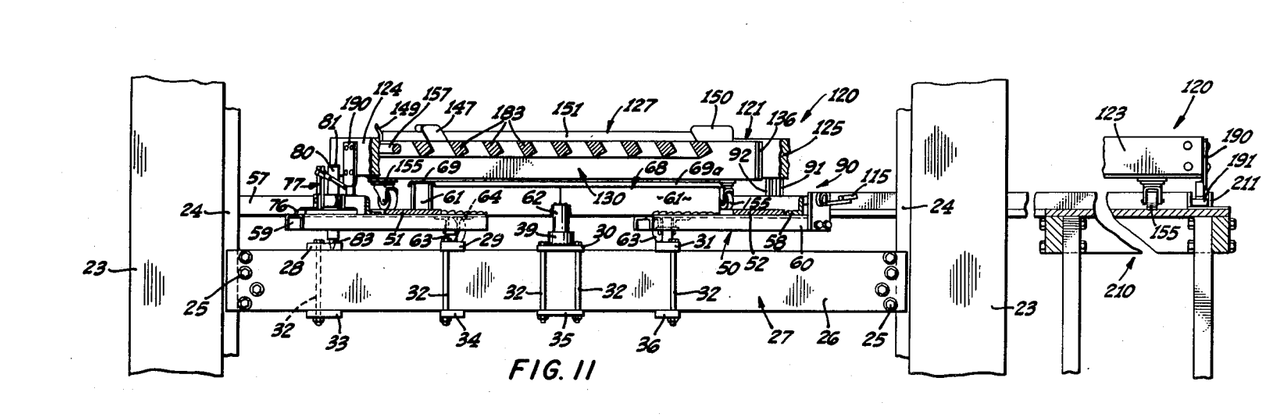
Fig. 11 is a vertical sectional view taken on the line 11—11 of Fig. 3.

Also secured to bottom faces of the border plates 51 and 52 in symmetrical relation with a transverse vertical plane midway between the ends of the table 50 are inverted channel sections 59 and 60. Overlying inwardly extending ends of the sections 59 and 60 and welded thereto are heavy bars 61, the planes of which intersect at the axis of the bearing 39, these bars being welded to a heavy pivot pin 62 which extends downwardly into the bearing 39 so as to pivot the table 50 on the axis of said bearing. The table 50 is supported on the anvil base 27 by rollers 63 which are pivotally mounted on brackets 64 provided on the channel sections 59 and 60, these rollers resting in rolling contact with the upper surfaces of the clamp plates 29 and 31. The heavy bars 61 unite to form an anvil 68 having a cover plate 69, opposite edges 69a of which are beveled as shown in Fig. 11.

Fixed on the upper face of the plate 51 in parallel relation with the angle iron guide 57, and opposite approximately one-half the length of the latter, is an angle iron guide 70 which cooperates with the guide 57 to form a U-shape guide track 71. Provided on inverted channel members 53 and 54 are guide rollers 72 and ball casters 73.

Fixed on the bracing system 55 and the bottom face of the plate 51 is an inverted channel member 74 on which a bell crank 75 is pivotally mounted.

Figure 12:
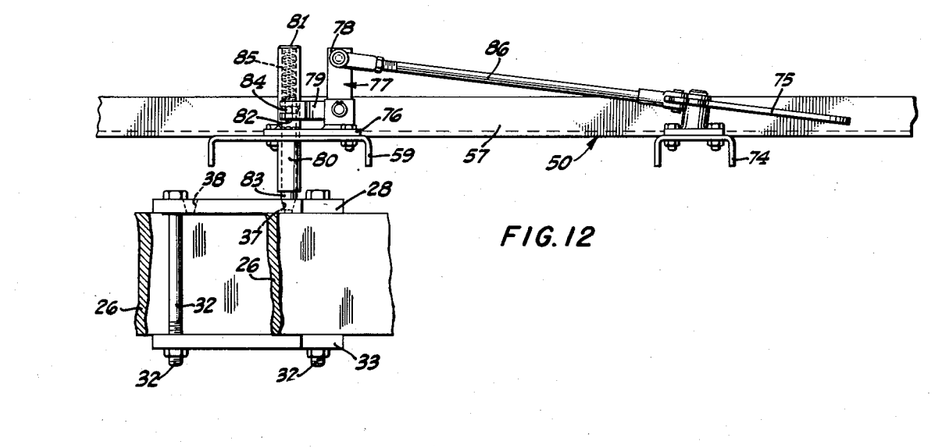
Fig. 12 is a fragmentary vertical sectional view taken on the line 12—12 of Fig. 3 and illustrates the manually controlled device for rotationally indexing the jig supporting table.

Fixed on the inverted channel section 59 just outside the guide 57 is a plate 76 on which a bell crank 77 is pivotally mounted, this having arms 78 and 79, the latter being slotted. Penetrating the channel 59 and plate 76 and welded to the latter is a vertical tube 80 having a cap 81 at its upper end and slots 82 in its sides. Slidable in the tube 80 is an indexing bolt 83 in which a pin 84 is imbedded crosswise so as to extend laterally through the slots 82 and the notches in the arm 79. Trapped in the tube 80 between the cap 81 and bolt 83 is a coiled expansion spring 85 which yieldably shifts the bolt 83 downwardly so that when it is opposite one of the holes 37 or 38 is shown in Fig. 12, the spring 85 extends the bolt 83 into that hole.

The bell crank 75 is connected to the arm 78 by a link 86 permitting the bolt 83 to be manually removed from one of the holes 37 and 38 by manipulation of the bell crank 75. The bolt 83 thus serves to index the table 50 in either of two positions, one of which is shown in Fig. 2, in which it is cocked out of rectangular relation with the nailing plane aforesaid of the nailing machine 20.

Figure 10:
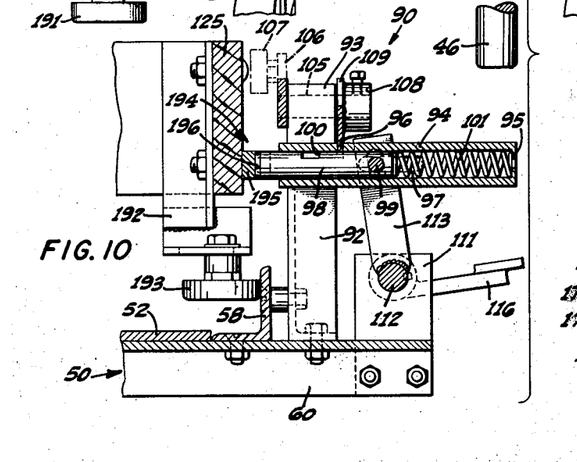
Fig. 10 is an enlarged vertical sectional view taken on the line 10—10 of Fig. 7.
Figure 14:
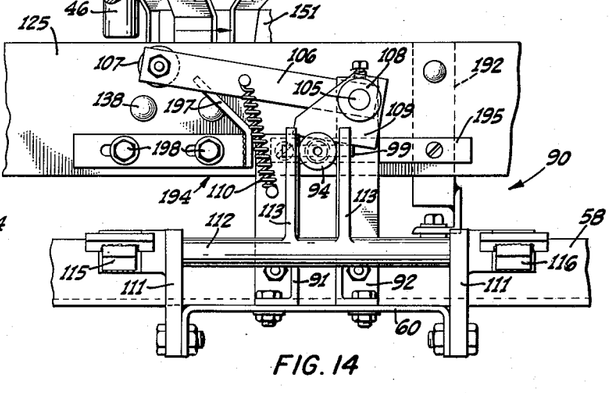
Fig. 14 is an enlarged view similar to Fig. 6 and illustrating the jig longitudinal indexing device just prior to its halting said jig in an indexed position.
Figure 15:
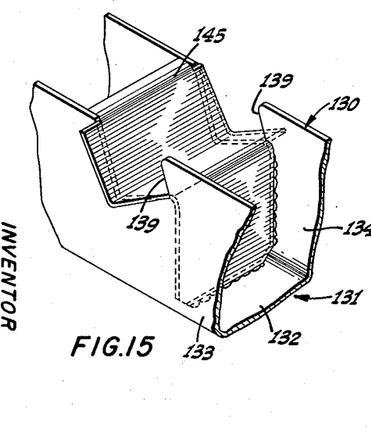
Fig. 15 is an enlarged fragmentary perspective view in section of one of the transverse forms of said jig.

Referring now to Figs. 10 and 14, a longitudinal indexing device 90 is provided on the inverted channel member 60. This includes a pair of angle-iron brackets 91 and 92 which are bolted to the member 60 and to the guide 58. The bracket 92 is longer than the bracket 91 and has a bearing 93 welded to its upper end. Disposed horizontally between the upper end of the bracket 91 and the bracket 92 and united with these brackets as by welding is a horizontal guide tube 94. This tube has an inturned flange 95 at its outer end and is provided with a cross slot 96 and longitudinal slots 97. Slidable in the tube 94 is a locking bolt 98 having a cross pin 99 which extends laterally through the slots 97 so as to prevent rotation of the bolt 98 in the tube 94 and limit its endwise movement therein. Trapped between the flange 95 and the bolt 98 is a coiled compression spring 101. Journalled in the bearing 93 is a shaft 105 which is fixed on one end of an arm 106 carrying a roller 107, the opposite end of shaft 105 having fixed thereto a collar 108 having a locking arm 109 which swings with the shaft 105 in the plane of the notch 96. Secured to the arm 106 and the bracket 91 is a coiled spring 110 which constantly urges the locking arm 109 to enter the slot 96. Bolted on opposite sides of the channel members 60 and extending upwardly therefrom are bearing brackets 111 in which a shaft 112 journals. Secured as by welding to this shaft and extending upwardly therefrom are slotted arms 113, through the slots in which opposite ends of pin 99 extend. Extending substantially horizontally from opposite ends of shaft 112 and keyed thereto are bolt release arms 115 and 116.

Figure 2:
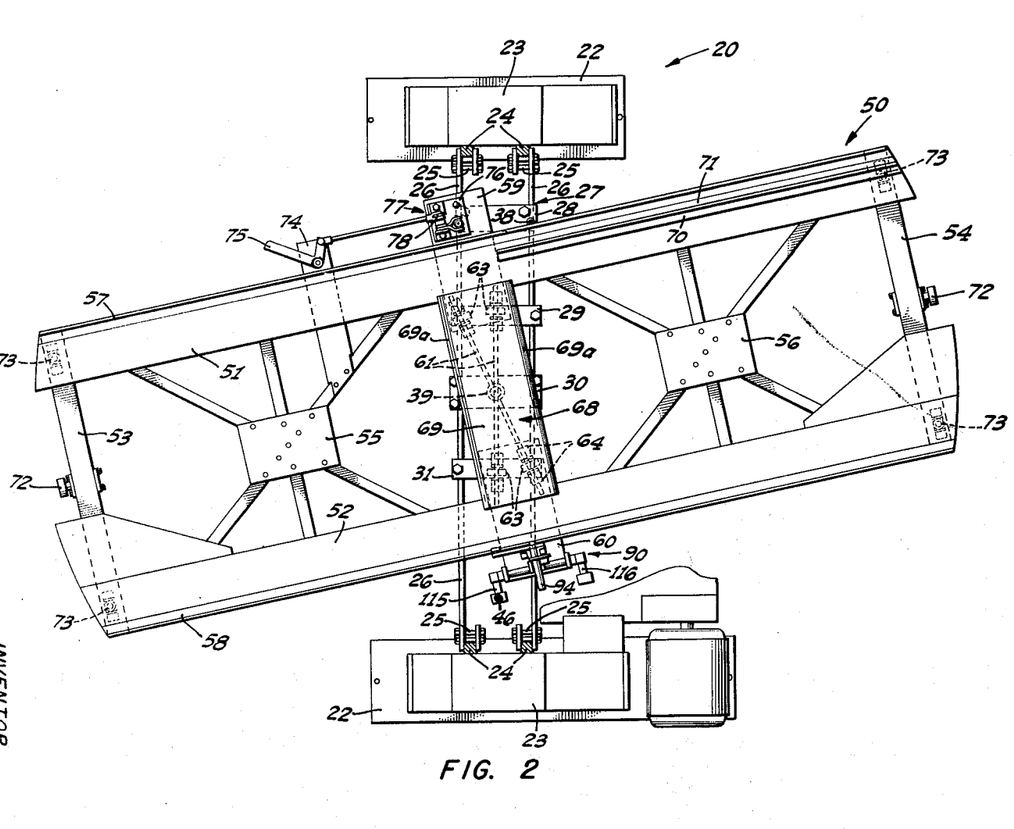
Fig. 2 is an enlarged diagrammatic plan view of the rotating table of the apparatus with an industrial nailing machine associated therewith shown in section.

The bolt release arm 115 is located in vertical alignment with the release bar 46 when the table 50 is in the indexed position in which it is shown in Fig. 2. When said table is swung to its other indexed position, in which the bolt 83 is lodged in the hole 38, the arm 116 is in vertical alignment with the release bar 46. Thus, regardless in which of said two rotationally indexed positions the table 50 may be, each action of the nailing mechanism of the nailing machine 20 to perform a nailing operation reciprocates the bar 46 vertically so as to engage one of the arms 115 or 116 which acts to depress this arm and retract the bolt 98 into the tube 94 to bring the notch 100 of this bolt opposite the slot 96 thereby permitting the spring 110 to insert the arm 109 into the notch 100 thereby holding the bolt 98 in withdrawn position for a purpose to be made clear hereinafter.

The table 50 is designed to accommodate jigs of various designs, each of which holds assembled thereon a series of wooden parts in the relationship in which it is desired that they be united by nailing operations of the nailing machine 20. As an example of the use to which this table may be put it is shown as designed for handling and associated with a jig 120 which comprises a rectangular frame 121 made up of wooden end members 122 and 123 and wooden side members 124 and 125 which are bolted together at the corners by angle brackets 126. Extending across the jig 120 at various angles relative thereto and fitting between and being secured to the side members 124 and 125 are work support forms 127, 128 and 129. Forms 127 and 128 are identical, as they are disposed at the same angle relative to the frame 121, and form 129 differs from forms 127 and 128 in that it is disposed with reference to the frame 121 at the same angle but in the opposite direction from the angle at which forms 127 and 128 lie with reference to said frame.

A general description of form 129 will therefore suffice for all three forms.

Referring now to Figs. 8, 9, 13, and 15 it is to be noted that form 129 includes a unitary sheet metal work support 130, the principal element of which is a deep sheet metal channel 131 having a bottom 132 and sidewalls 133 and 134 and having attaching plates 135 and 136 welded to said channel at its ends. It will be noted that these attaching plates are obliquely disposed relative to the longitudinal axis of the channel 131 and are secured by bolts 137 and 138 to the wooden jig side members 124 and 125 respectively.

The walls 133 and 134 are provided with a series of pairs of notches 139, the notches of each pair being aligned on an axis parallel with the plates 135 and 136. Resting in each pair of notches 139 and welded to adjacent surfaces of the channel 131 is a chair-shaped seat 145.

Between the seat 145 next to the attaching plate 135 and the adjacent seat 145, the channel 131 has secured to inner faces of the sidewalls 133 and 134 thereof, by bolts 146, a pair of cleat guides 147 which may be spaced inwardly from the sidewalls by shims 148. On the left hand end of the support 130 is a fixed cleat stop 149. Bolted on sidewalls 133 and 134 near the right hand end of the support is a pair of longer cleat guides 150 which assist the guides 147 in centering a cleat 151 when the latter is placed in the form. Pivoted at its lower end on the walls 133 and 134 to swing between the guides 150 is a cleat endwise flusher 152, the inward movement of which is limited by a bolt 153. This bolt passes through apertures in the end plate 136 and flusher 152 and has coiled thereabout a compression spring 154 which swings the flusher 152 against the cleat 151 thereby pressing the latter against the fixed stop 149.

Figures 3, 3A:
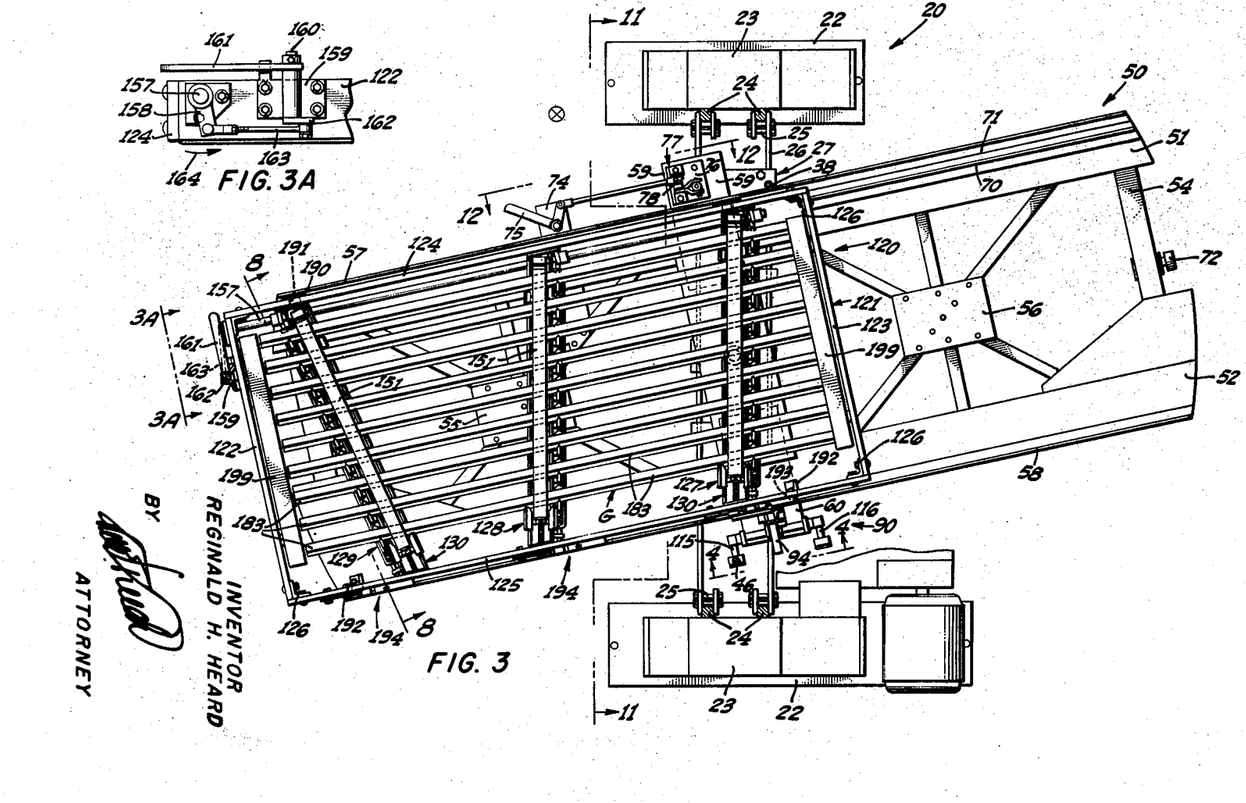
Fig. 3 is a view similar to Fig. 2 and illustrating a loaded jig resting on the aforesaid rotating table in position for the first nailing operation on the work carried thereby.
Fig. 3A is a fragmentary enlarged elevational view of the slat clamping control device of a jig of the invention, and is taken on the line 3A—3A of Fig. 3.

Mounted on the bottom of the channels 131 of forms 129 and 127 near the ends of these channels are four rubber tired casters 155 which are located over and rest upon the plates 51 and 52 to support the jig 120 on the table 50 as shown in Figs. 3 and 11.

Journalling in bearings 156 provided on the form end plates 135 is a shaft 157 having an arm 158. Provided on frame end member 122 is a bearing 158 in which a vertical shaft 160 journals, this having a handle 161 on its upper end and an arm 162 on its lower end. The arm 162 is connected by a link 163 to the arm 158 as shown in Fig. 3A so that when the handle 161 is swung to rotate the arm 162 toward shaft 157 and over dead center, as shown in Figs. 3 and 3A, the shaft 157 is rotated in the direction of the arrow 164 and locked temporarily in the position to which it has been rotated.

To unlock the shaft 157 and give it a partial rotation in a reverse direction from the position in which it is shown in Fig. 3A, the handle 161 is pulled outwardly and swung 180° from the direction in which this handle is shown as extending from the shaft 160 in Figs. 3 and 3A.

The shaft 157 has an arm 167 located adjacent each of the forms 127, 128, and 129, each of these arms having a pin 168 extending parallel with the shaft 162 and having a ball 169 on said pin. Formed on the channel sidewall 133 and extending outwardly therefrom are bearings 170 in which a shaft 171 is slidably received. The end of the shaft 171 adjacent the shaft 157 has a square eye 172, into which the pin 168 and ball 169 extend so that rotation of the shaft 162 imparts longitudinal motion to the shaft 171.

Slidable on the shaft 171 is a series of rectangular frames 173, a block 174 being fixed upon said shaft within each of said frames. Extending through apertures formed in opposte sides of each of the frames 173 are pins 175. Coiled about the shaft 171 between each of the blocks 174 and the opposite end of the frame 173 surroundng said block is an expansion spring 176. Pivotally mounted on a bushing 177 which is spaced from the channel wall 133 by a sleeve 178 and secured to said wall by a bolt 179, is a lever 180. This lever has a spike 181 fixed on its upper end and has its lower end bifurcated to form slotted arms 182 through which pins 175 extend so that longitudinal movement of the frame 173 carrying these pins is transmitted to the lever 180 causing this to rock and press the spike 181 against a slat 183 which is resting in the adjacent seat 145.

Freely rotatable on the lower ends of brackets 190 fixed on jig frame member 124 are rollers 191 which bear against the inner face of angle guide 57 of the rotatable table 50. Adjustably mounted on the lower ends of brackets 192 which are fixed on jig frame member 125 for free rotation thereon are guide wheels 193 (Fig. 10) which bear against the inner face of the angle iron guide 58. The wheels 193 are adjusted on brackets 192 so that these wheels and the rollers 191 snugly engage the inner faces of the angle iron guides 57 and 58 thereby giving a uniform transverse location to each jig 150, with reference to the table 20, when said jig is resting thereon.

Provided on the outer face of the wooden frame side member 125 is a series of control groups 194, one of which is provided for use in connection with each of the frames 127, 128, and 129. Each of the control groups 194 includes a bolt track 195 having a notch 196 in the outer surface thereof and a latch release cam 197 which is secured to the member 125, for longitudinal adjustment thereon, by bolts 198.

Mounted on inner faces of end frame members 122 and 123 are slat end guides 199 which are shaped to engage the opposite ends of the slats 183 when these are placed in the seats 145 as when loading a jig 120.

The jigging apparatus 21 also includes a platform 210 which provides a supporting surface for one or more jigs 120 when they are traveling from the discharge end of the table 50 through an unloading position and a loading position and then back onto the table into one of a series of nailing positions.

The area of the platform 210 is so disposed as to provide a support for the rubber tired casters 155 of the jigs 120 when these jigs are traveling from and to the table 50. The table also has a channel shaped track 211 into which the guide wheels 191 are guided by the guide track 71 of the table 50 as the jig leaves this table, so that throughout the travel of the jig on the platform 210 these rollers ride in track 211 and guide the jig through its various unloading and loading positions and then back onto the receiving end of the table 50 with the latter positioned as shown in full lines in Fig. 1. While the number of jigs used may vary, the apparatus 21 llustrated in Fig. 1 is adapted to operate at maximum efficiency with three jigs.

Provided on the structure of the platform 210 adjacent arcuate edges 215 and 216 thereof, which are shaped concentrically with the axis of the table 50 and lie adjacent the ends of this table, are arcuate tracks 217 and 218 on which the rollers 72 and ball casters 73 ride to balance the table 50 longitudinally and maintain the upper surfaces of the plates 51 and 52 on the same level as that of the platform 210.

*Operation*

Figure 1:
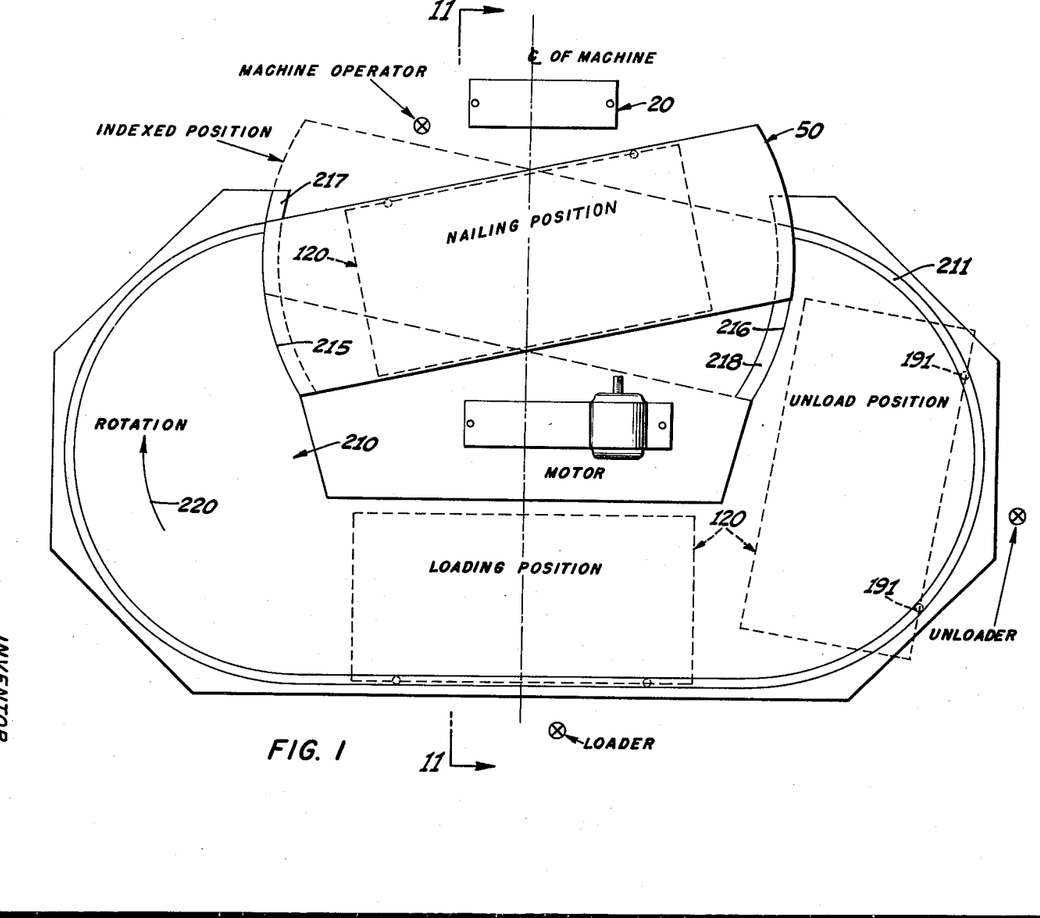
Fig. 1 is a diagrammatic plan view of a preferred embodiment of the invention.

The nailing machine 20 and jigging apparatus 21 may be employed for the manufacture of a cooling tower grid G by a crew of three men using three jigs 120 which are shown in Fig. 1 as normally related at a selected instant in the operational routine.

The crew includes a loader, a machine operator, and an unloader. The loader works at placing slats and cleats in a jig with the latter in what is indicated as "loading position" in Fig. 1. The machine operator puts the loaded jig through the nailing machine 20 while the jig is supported on the table 50. The unloader removes a completed grid G from the jig when the latter is approximately in "unload position" as indicated in Fig. 1.

When all of the three crewmen have completed performing their individual functions above indicated, each working on a different jig, each crewman shifts the jig he has just finished working on in the direction of the arrow 220 to the next crewman to his left, and then each crewman repeats his special function in connection with the jig which he has just received from the crewman on his right.

To empty a jig 120, the handle 161 is rotated 90° from its position in Figs. 3 and 3A so as to rotate all of the levers 180 and retract the spikes 181 away from the seats 145. The completed grid G is now lifted from the jig, as by hand, and stacked. A jig 120 is in this emptied condition when it is delivered by the unloader to the loader.

Figure 8:
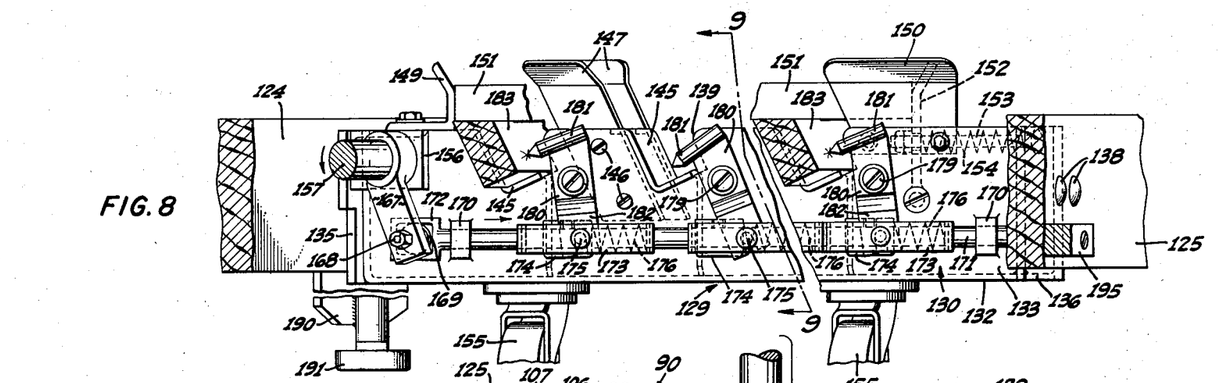
Fig. 8 is an enlarged fragmentary sectional view taken on the line 8—8 of Fig. 3 and illustrates one of the transverse work supporting forms of said jig.
Figure 9:
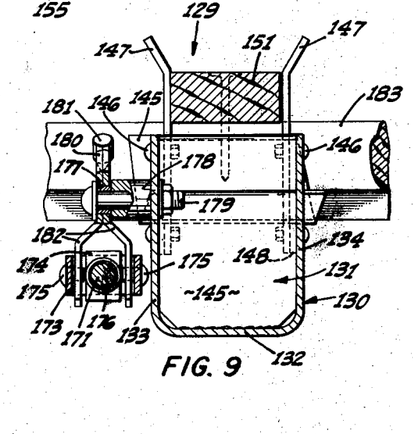
Fig. 9 is a cross sectional view taken on the line 9—9 of Fig. 8.
Figure 13:
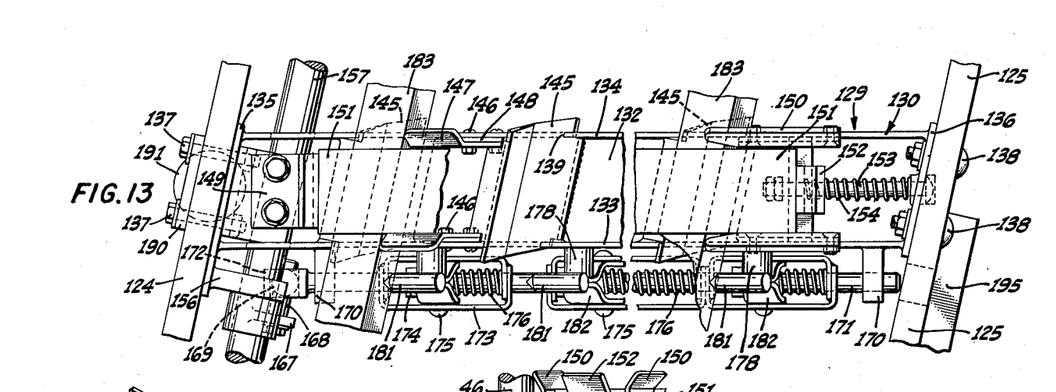
Fig. 13 is a plan view of Fig. 8.

To load the jig, the loader places a series of nine slats 183 in the seats 145 provided for receiving these in the forms 127, 128, and 129. When placing these slats in the jig, the loader uniformly positions these with the ends thereof at one end of the jig in contact with the stop 199 at that end. He then inserts a cleat 151 in each of the forms 127, 128, and 129 by lowering one end of that cleat between the pair of guides 150, pushing this cleat against the flusher 152 to compress the spring 154 and then dropping the cleat inside of the fixed end stop 149 permitting the spring 154 to flush cleat 151 against said stop as shown in Figs. 3, 8 and 13. The loader now swings the handle 161 to rotate shaft 157 as shown in Fig. 8 to swing the spikes 181 against the slats 183 thereby correctly positioning these slats in seats 145.

Attention is here called to the fact that the omission of a slat 183 from one of the seats 145 illustrated in Figs. 8 and 13 is for the purpose of revealing the structure of the seat thus left vacant. To be consistent, the lever 180 associated with the vacant seat in these views is shown as it would be swung to an exaggerated degree by the lack of a slat in said seat to resist said swinging movement.

Having finished loading his jig, the loader rolls this along the platform 210 into the free space thereon shown in Fig. 1 at the left of the loading position. At the same moment, the unloader shifts his unloaded jig leftward along the track 211 where it is taken in charge by the loader and placed in the loading position.

Having completed the assembly of the grid carried by the jig on the table 50 with the latter in its broken line position shown in Fig. 1, the machine operator propels this jig manually from the table 50 onto the platform 210 with the rollers 191 of the jig guided by the track 211 until this jig reaches the unload position shown in Fig. 1.

The machine operator then swings the bell crank 75 to lift the bolt 83 from the hole 39 in the plate 28 and swings the table 50 into the full line position in which this is shown in Fig. 1. The machine operator then draws the loaded jig, resting on the left hand end of the platform 210, onto the table 50 and proceeds to position this jig in three successive positions in each of which one of the forms 127, 128 and 129 is in vertical alignment with the nailing plane of the nailing machine 20, and to actuate the nailing machine to drive nails through the respective cleats and slats with which said jig is loaded.

Figure 4:
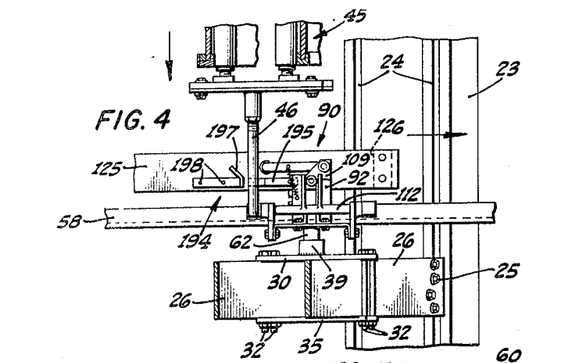
Fig. 4 is a fragmentary vertical sectional view taken on the line 4—4 of Fig. 3 and illustrates the approach of the jig shown in Fig. 3 to the longitudinally indexed position in which it is shown therein.
Figure 5:
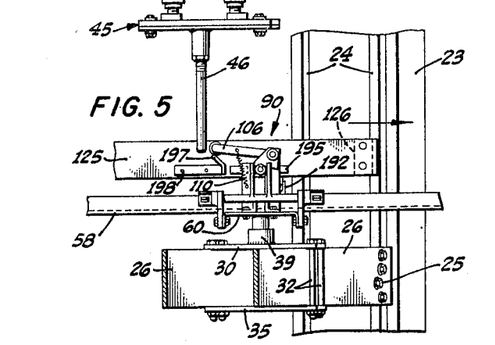
Fig. 5 is a view similar to Fig. 4 showing said jig at a further point in its progress towards said indexed position.
Figure 6:
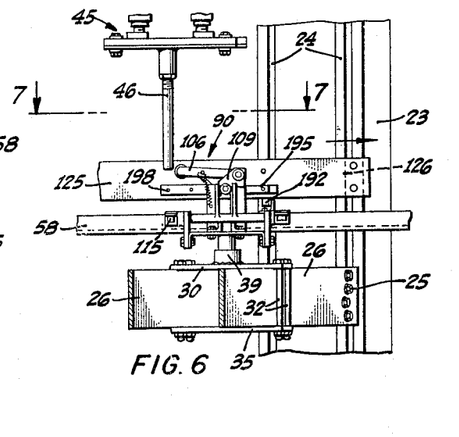
Fig. 6 is a view similar to Fig. 5 and illustrates the arrival of said jig in said indexed position.
Figure 7:
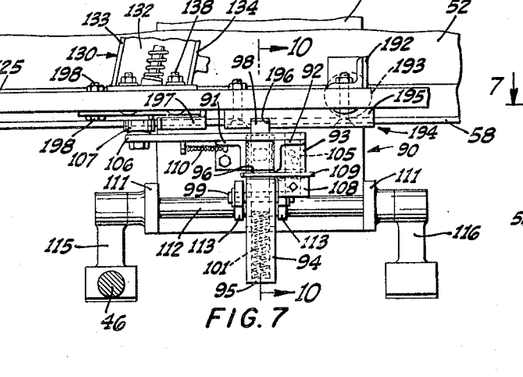
Fig. 7 is an enlarged horizontal sectional view taken on the line 7—7 of Fig. 6.

Fig. 3 illustrates a jig 120 in the first of these nailing positions. The jig was delivered into this position by the machine operator merely pushing the jig onto the table 50 until the control group 194 associated with the form 127 had passed through the successive positions in which this is shown in Figs. 4 and 5 and into the position in which it is shown in Fig. 6. As this control group approaches the indexing device 90 (Fig. 4) the latch release cam 197 of this group engages roller 107 of the device 90 (Fig. 3) to lift this and withdraw the latch arm 109 from the notch 100 in the bolt 98, thereby permitting the spring 101 to impell this bolt inwardly against the bolt track 195. Thus upon the arrival of the jig 120 in the position in which it is shown in Figs. 6 and 7, this bolt snaps into the notch 196 in said bolt track thereby indexing the jig 120 for its first nailing operation as shown in Figs. 3 and 10.

The machine operator now depresses the pedal (not shown) for causing the nailing machine 20 to reciprocate the nail driver head 45 downwardly and upwardly to drive nails vertically downwardly in the nailing plane of the machine and as the latter is symmetrically disposed with the cleat 151 carried by the form 127 with the jig 120 thus indexed, these nails penetrate this cleat along the center line thereof and pass through this and into the slats 183 resting in the seats 145.

With this reciprocation of the driver cross head 45 of the nailing machine, the lock release bar 46 descends into engagement with the arm 115 thereby rotating shaft 112 and withdrawing the bolt 98 from the notch 196 and permitting the latch arm 109 to drop into the notch 100 thereby withholding the bolt until it is released for indexing the jig in its next nailing position by the machine operator pushing the jig along the table 50 until the next control group 194 associated with the form 128 comes opposite the locking device 90 resulting in the indexing of the jig 120 properly for performing the second nailing operation.

As the form 128 is parallel with the form 127, no change in the angular relation of the table 50 relative to the nailing machine 20 is necessary to ready the work for the second nailing position.

Actuation of the nailing machine to drive nails through the second cleat 151 into each of the slats 183 again releases the jig to permit it to be moved into its third nailing position. As this is located at an oblique angle with reference to the first and second nailing positions, it is not only necessary for the operator to advance the jig 120 to where the third control group cooperates with the locking device 90 to properly index the jig 120 longitudinally on the table 50 for the third nailing operation, but he must also manipulate the bell crank 75 to withdraw the bolt 83 from the hole 37 and then swing the table, while releasing said bolt, to permit the latter to enter the hole 38 and index the table 50 in the broken line position in which this is shown in Fig. 1.

The jig 120 is thus indexed with the form 129 in alignment with the nailing plane of the nailing machine 20 and the third nailing operation is then accomplished by tripping the control pedal of the nailing machine. In this nailing operation bar 46 engages and depresses arm 116 of the device 90. This automatically releases the jig 120 from the device 90 at a time when the discharge end of the table 50 is already aligned with the platform 210, and the track 211 thereon, so that immediately upon the consummation of the third nailing operation the machine operator may manually propel the jig carrying the completed grid onto the platform 210 to a point where it may be seized by the unloader and transferred entirely from the table 50 onto the platform 210. In the manner above pointed out, the machine loader swings the table 50 back to where it is indexed in the full-line position in which it is shown in Figs. 1, 2, and 3 with the table empty as shown in Fig. 2 in readiness for receiving another loaded jig 120.

It is desired to point out that with each nailing operation a tremendous downward pressure is applied to that one of the supports 127, 128, or 129 which is supporting the work in the nailing plane. This pressure causes the rubber tires of the casters 155 to yield, permitting the form in the nailing plane to come to rest on the cover plate 69 of the anvil 68 in alignment with one of the anvil bars 61 so that this bar supports this form and the work carried thereby, this bar 61 being in turn supported by the rollers 63 mounted thereon and the structure of the anvil base 27 on which these rollers ride (Fig. 11).

The inclined edges 69a of the cover plate 69 act as guides for the forms 127, 128 and 129 when the jigs 120 are being shifted along the table 50 in the operation of the apparatus 21.

I claim:

1. In a device for presenting special work to an industrial nailing machine, the combination of: a table intersecting the nail driving plane of said nailing machine and rotatable about a vertical axis; a track on said table for guiding a jig longitudinally thereon; a jig adapted to move along said table in guided relation therewith; an assembly platform which is adapted to support said jig and to receive the same when moved longitudinally from said table and guide said jig along a path which terminates at the opposite end of said table; and guide means on said platform for guiding said jig along said path as it is received on said platform from said table and maintaining said jig on said path guiding said jig back onto said table when said jig reaches the end of said path.

2. A combination as in claim 1 in which means is provided for indexing said jig in various longitudinal positions on said table for the performance of a series of nailing operations on work carried by said jig; and secondary indexing means for locking said table in either of two angled positions of said table relative to said nailing machine.

3. A combination as in claim 1 having indexing means for locating said table in either of two angled positions of said table relative to said nailing machine, said table being angled to receive a jig from said platform in one of said positions of said table and being angled to discharge a jig therefrom onto said platform in the other of said angled positions of said table.

4. A combination as in claim 1 in which the vertical axis of rotation of said table lies in the aforesaid vertical plane of nailing of said nailing machine.

5. In a jigging apparatus for an industrial nailing machine which drives nails in a given nailing plane, the combination of: a platform providing an endless path which extends through said nailing machine in a substantially horizontal plane; a series of wheeled jigs supported on said platform and adapted to travel around said endless path; a table incorporated with said platform and forming a portion of said path, said table extending into said nailing plane; and means for changing the angular relation of said table with said nailing plane while said table is supporting one of said jigs to alter the angular relation of said jig with said plane for successive nailing operations on work carried by said jig.

6. In a jigging apparatus for an industrial nailing machine which drives nails in a given nailing plane, the combination of: a table providing a pathway extending through said nailing plane; a jig adapted to hold work elements in the assembled relation in which it is desired they be united by nails, said jig being supported upon and adapted to travel over said table along said pathway; an anvil disposed in said nailing plane a slight distance below said jig, said jig being yieldable so as to be depressed until it comes to rest on said anvil, by the downward pressure applied by said nailing machine against said work incidental to a nailing operation.

7. A combination as in claim 6 in which said jig is provided with rubber tired wheels which support the same when it travels along said path, said wheels yielding during the nailing operation to permit the jig to come to rest on said anvil.

8. A combination as in claim 6 in which said anvil is embodied with said table; and means for rotating said table about a vertical axis to vary the angular relation between said nailing plane and said jig in successive nailing operations.

9. A combination as in claim 6 in which said table is pivotally related to said nailing machine to rotate relative thereto; and means for indexing said table in different angular positions relative to said nailing machine in successive nailing operations.

10. A combination as in claim 6 in which said table is rotatable about an axis lying substantially in said nailing plane whereby the angular relation of said table, said jig and work carried on the latter relative to said nailing plane may be varied for successive nailing operations, said anvil being provided on said table and rotating therewith, said anvil providing a separate jig supporting bar for each of the different angular relations aforesaid between said table and said nailing plane; and means for indexing said table in said different angular relations with said plane.

11. In a jigging apparatus for an industrial nailing machine, the combination of: a table extending through said nailing machine and movable between a plurality of positions relative thereto; a jig adapted to hold work elements in an assembled relation in which it is desired they be united by nails, said jig being adapted to be supported on and to travel over said table through said machine; a stationary U-shaped assembly platform disposed substantially on the same level as said table, opposite end portions of said platform embracing said table and uniting therewith, whereby said platform provides a runway, over which a jig may travel from one end of said table onto said platform and then from said platform onto the opposite end of said table; co-operative guide means on said jig and said platform for guiding said jig in its travel over said platform from the point where said jig is received from one end of said table to the point where it is delivered onto the opposite end of said table; and separate guide means provided on said table for co-operating with the guide means on said table for guiding said jig in its travel across said table.

12. In a jigging apparatus for an industrial nailing machine, the combination of: a table extending through said nailing machine; a jig adapted to hold work elements in an assembled relation in which it is desired they be united by nails, said jig being adapted to be supported on and to travel over said table through said machine; an assembly platform disposed substantially on the same level as said table and uniting therewith to provide a runway over which a jig may travel from one end of said table onto said platform and then from said platform onto an opposite end of said table; means pivotally relating said table to said nailing machine whereby said table is swingable between two positions in one of which said table is adapted to receive a jig from said platform and in the other of which said table is adapted to deliver a jig onto said platform; and guide means on said platform for guiding said jig in its travel over said platform from the point where said jig is received from one end of said table to the point where it is delivered onto the opposite end of said table.

13. In a jigging apparatus for an industrial nailing machine which drives nails in a given nailing plane, the combination of: a table extending through said nailing plane; means for mounting said table to rotate about a vertical axis; a jig adapted to hold work elements in assembled relation, said jig being adapted to be supported upon and travel over said table; primary means for indexing said jig in a series of progressively advanced positions on said table; and secondary means for indexing said table in either of a plurality of angular positions relative to said nailing plane.

14. A combination as in claim 13 in which said primary indexing means automatically latches said jig in one of said series of positions relative to said table when said jig is moved into said position; and means responsive to the actuation of the nailing mechanism of said machine with said table in either of its two angular positions aforesaid, to actuate said primary indexing means to release said jig therefrom and permit said jig to be moved to its next advanced position relative to said table.

15. In a jigging apparatus for an industrial nailing machine, the combination of: a table extending through said nailing machine and movable between a plurality of positions relative thereto; a jig adapted to hold work elements in an assembled relation in which it is desired they be united by nails, said jig being adapted to be supported on and to travel over said table through said machine; a stationary U-shaped assembly platform disposed substantially on the same level as said table, opposite ends of said platform embracing said table and uniting therewith to provide a runway over which a jig may travel from one end of said table onto said platform, and, continuing on said runway, travel from said platform onto the opposite end of said table; guide tracks on said table and platform for guiding said jig in its travel along said runway; and rollers extending downwardly from said jig to engage successively with said guide tracks to determine the paths travelled by said jig over said table and over said platform.

16. A combination as in claim 12 in which a guide track is provided on said table for guiding a jig travelling thereon, one end of said table matching with the corresponding end of said platform when said table is in one of said positions, the other end of said table matching with the opposite end of said platform when said table is in the other of said positions, corresponding ends of said track and said guide means at the matching end of said table meeting in matching relation to provide a continuous guiding of a jig as it is being transferred from said table onto said platform or from said platform onto said table.

17. A combination as in claim 16 including primary means for temporarily indexing said jig in each of a progressive series of working positions on said table.

18. A combination as in claim 17 including secondary means for temporarily indexing said table in either of its said positions.

19. A combination as in claim 18 including means responsive to the actuation of said nailing machine with said table in either of its two positions to release said pig from said primary indexing means to permit said jig to be moved to its next working position.

20. In a jigging apparatus for an industrial nailing machine, the combination of: a table extending through said nailing machine; means for pivoting said table about a vertical axis to swing said table between a plurality of different angular positions relative to said nailing machine; a jig adapted to hold work elements in an assembled relation in which it is desired they be united by nails; a guide track on said table for guiding said jig in alignment with said table; means for securing said table in any of said plurality of angular positions; and means for indexing said jig to halt the same in each of a series of working positions as it travels along said table.

21. A combination as in claim 20 in which a U-shaped platform is provided with the latter located on substantially the same level as said table and with opposite ends of said platform embracing said table; and guide means on said platform which are brought into co-operating relation with said track, when said table is swung into a certain one of its rotational positions aforesaid, so as to guide said jig from said table onto said platform.

22. A combination as in claim 21 in which said track and said guide means are brought into co-operating relation to guide said jig from the opposite end of said platform onto said table by placing the latter in a certain different one of its angular positions aforesaid.

REGINALD H. HEARD.

REFERENCES CITED

The following references are of record in the file of this patent:

UNITED STATES PATENTS

| Number | Name | Date |
|---|---|---|
| 920,290 | Eklund | May 4, 1909 |
| 1,237,038 | Henderickson | Aug. 14, 1917 |
| 1,710,785 | Peabody | Apr. 30, 1929 |
| 1,953,215 | Clark | Apr. 3, 1934 |

FOREIGN PATENTS

| Number | Country | Date |
|---|---|---|
| 314,688 | Great Britain | July 4, 1929 |